Jan. 17, 1939.  O. E. SIMMONDS  2,144,553
FASTENING DEVICE INCORPORATING A NUT
Filed March 8, 1938   2 Sheets-Sheet 1
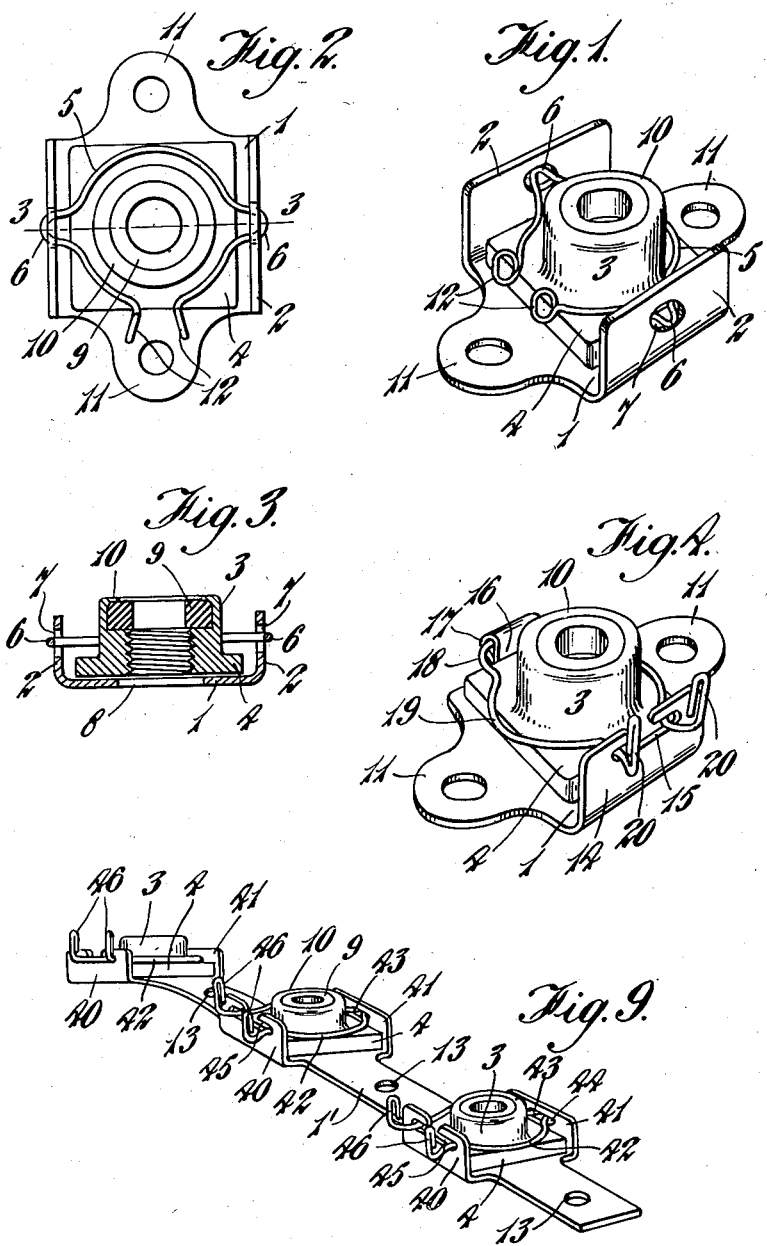
INVENTOR
OLIVER E. SIMMONDS
By Norris & Bateman
ATTORNEYS

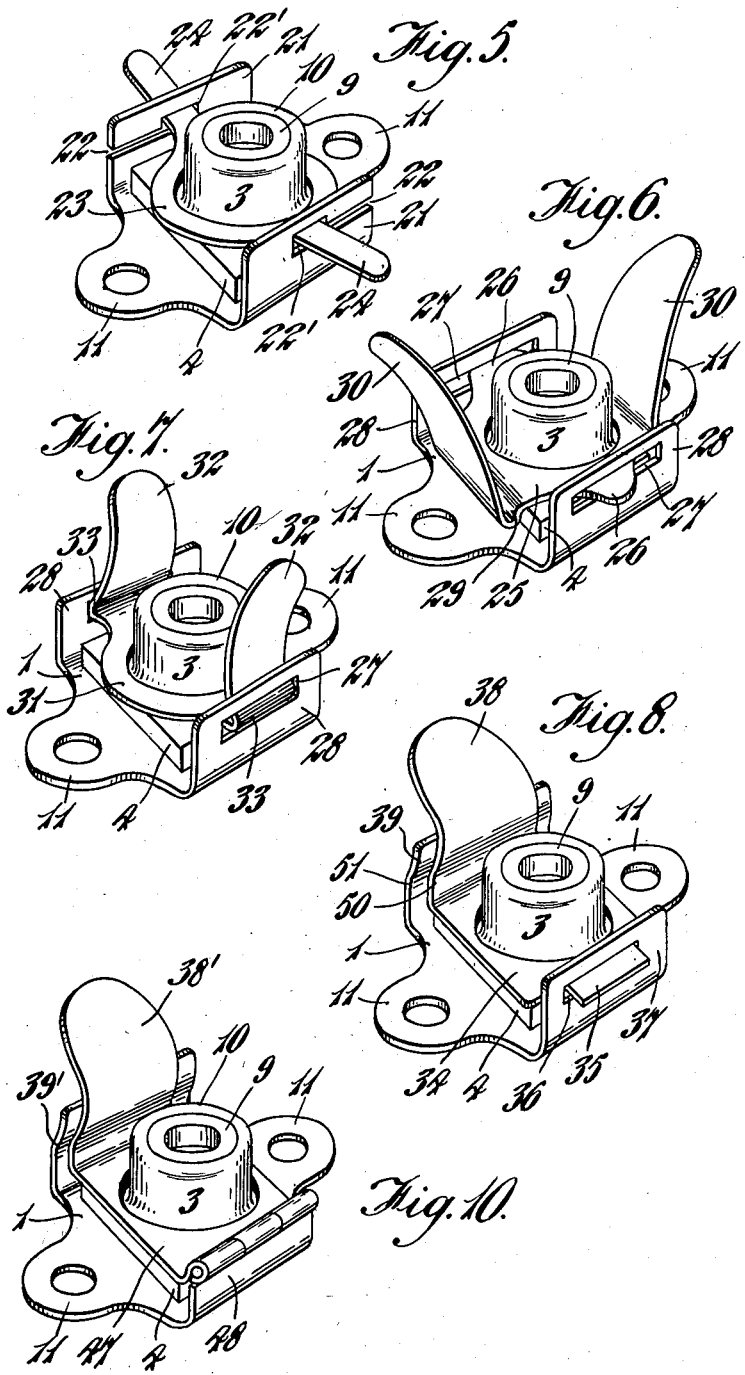

Patented Jan. 17, 1939

2,144,553

UNITED STATES PATENT OFFICE 2,144,553

FASTENING DEVICE INCORPORATING A NUT

Oliver Edwin Simmonds, London, England, assignor to Simmonds Development Corporation Limited, London, England Application March 8, 1938, Serial No. 194,690
In Great Britain March 25, 1937

14 Claims. (Cl. 85—32)

This invention relates to an improved fastening device incorporating a nut.

The improved fastening device according to this invention comprises a plate or like member, hereinafter referred to as a plate, a nut mounted thereon so that it cannot rotate relatively to the plate, and means cooperating with the said nut and plate to secure removably the nut to the plate, whereby the nut may be removed from the fastening device and replaced by another nut as desired without deforming the said plate.

In the present preferred form of the improved fastening device, the plate is formed with a plurality of upstanding flanges or lugs between which the nut is housed, the nut is formed with one or more lateral projections adapted to engage the flanges or lugs on the plate so that the nut cannot rotate relatively to the plate, and the nut is removably secured to the plate by a nut-retaining member which comprises a part that encircles or substantially encircles the nut above the said lateral projection or projections thereon and which also comprises projecting parts adapted to be brought into or out of engagement with the said flanges or lugs on the plate whereby the nut may be secured to and removed from the plate. The nut-retaining member advantageously comprises a spring clip that has projecting parts which engage the flanges or lugs on the said plate and which, on compression of the said spring clip, may be brought out of engagement with said flanges or lugs. In a modified form of the device, the nut-retaining means comprises a plurality of pins, wires or like members which extend transversely of the plate above the lateral projection or projections on the nut and which engage the said flanges or lugs on the plate. In this form of the invention, at least one of the pins or like members is adapted to be brought into and out of engagement with the flanges or lugs to allow the nut to be secured to and removed from the plate.

The nut is preferably secured on the plate in such a manner that it may move laterally relatively to the plate to a limited extent but cannot rotate relatively to the plate, the plate being formed with a hole which is larger than the bore of the nut so that the hole in the plate may register with the bore of the nut for various positions of the nut allowed by the limited relative lateral movement thereof.

A plurality of nuts may be removably secured on a single plate in the manner described above. For example, a plurality of nuts may be secured on a plate in the form of a narrow metal strip which may be straight, or curved or bent in or out of the plane in which the major portion of the strip lies.

The invention will be further described with reference to the accompanying drawings, in which like parts are designated by like reference numerals, and in which—

Figure 1 is a perspective view of one form of fastening device,

Figure 2 is a plan view of the fastening device shown in Figure 1,

Figure 3 is a section on the line 3—3, Figure 2, and

Figures 4 to 10 are perspective views illustrating other forms of fastening device in accordance with this invention.

Referring first to Figures 1 to 3, the plate 1 is formed with upstanding flanges 2 so as to form a channel within which the nut 3 is housed. The base of the nut 3 has a lateral projection in the form of a flange 4 which is square, as shown, or of such other shape that the nut cannot rotate relatively to the plate, the exterior of the part of the nut above the flange being cylindrical. The nut 3 is removably secured to the plate 1 by the spring clip 5 which encircles the nut above the flange 4 and which has projecting parts 6 that are urged to extend through holes 7 in the flanges 2. The spring clip 5 is formed from a single piece of wire bent to the required shape with its ends lying close one to the other and bent to form finger grips 12 whereby such ends may be pressed towards one another to bring the projections 6 clear of the holes 7, thus allowing the nut to be removed from the plate 1 and replaced by a new nut. The configuration of the flange 4 in relation to the channel formed by the flanges 2 on the plate 1 and the shape of the spring clip 5 are such as to allow limited lateral movement of the nut relatively to the plate 1, the plate being formed with a hole 8 which is of larger diameter than the screw-threaded bore of the nut so that such bore may register with the hole 8 in the plate for the various positions of the nut allowed by the limited relative lateral movement thereof. The spring clip may, according to a modified form, be so shaped that the projecting parts thereof engage the holes in the flanges on the plate from the outer sides thereof.

In the constructional form of the improved fastening device shown in Figure 4, one edge of the plate 1 is formed with an upstanding flange 14 having therein an open slot 15, the opposed edge of the plate having thereon a lug 16 with a bent over portion forming a hook 17 adapted to engage the projecting loop 18 of the spring clip 19, the ends of which extend through the slot 15 and are bent upwardly to form finger grips 20, the end portions of the clip 19 being urged apart so that the nut 3 is secured to the plate 1. In this form of the device, when it is desired to remove the nut, the finger grips 20 are pressed towards one another against the spring action, whereby the end portions of the spring clip 19 may be withdrawn from the flange 14 through the opening in the slot 15 and the loop 18 disengaged from the hook 17.

In the modified constructional form shown in Figure 5, the plate 1 is provided with flanges 21 forming a channel and such flanges are formed with open stepped slots 22. The nut-retaining member comprises an annular nut-encircling strip 23 having resilient arms 24 which extend through the slots 22 and which are urged upwardly into the recesses 22', the nut 2 being thereby secured to the plate 1. In this form of the device, the nut may be removed from the plate by pressing downwardly the arms 24 and giving the nut-retaining member a pivotal movement so that the arms 24 pass through the slots 22 and the nut-retaining member is disengaged from the plate flanges.

In the constructional form shown in Figure 6, the plate 1 is provided with flanges 28 forming a channel, and the nut-retaining member comprises a plate 25 having an aperture therein through which the upper part of the nut extends, the plate 25 being formed with ears or lugs 26 which extend through closed slots 27 in the flanges 28, the slots 27 being of greater width than the ears or lugs 26. The plate 25 is formed with transversely-extending flanges 29 that co-operate with the adjacent edges of the flange 4 on the nut so that pivotal movement of the nut-retaining member relatively to the plate 1 is substantially prevented, and the nut is secured to the plate 1. In this constructional form, the nut 3 may be removed from the plate 1 by pressing the resilient arms or finger grips 30 towards one another to raise the flanges 29 clear of the flange 4, whereby the nut-retaining member may be given a pivotal movement to bring the lugs 26 out of engagement with the slots 27.

In the modified constructional form shown in Figure 7, the nut-retaining member comprises an annular nut-encircling part 31 formed with resilient arms 32 having thereon lateral projections 33 which are urged into the slots 27 in the flanges 28 to retain the nut on the plate 1. On pressing the arms 32 towards one another, the projections 33 are brought out of engagement with the slots 27, thus allowing the nut to be removed from the plate 1.

In the constructional form shown in Figure 8, the nut-retaining member comprises an apertured plate 34 having on one side thereof a lug 35 which extends through a slot 36 in the flange 37 on the plate 1, and on the other side a resilient arm 38 having a corrugation 50 which is urged into engagement with a corresponding corrugation 51 on the flange 39 of the plate 1, whereby the nut is secured to the plate 1. When it is desired to remove the nut, the arm 38 is pressed towards the nut 3 whereby the arm 38 and flange 39 are brought out of engagement, thus allowing the lug 35 to be brought clear of the slot 36.

A form of the present fastening device in which a plurality of nuts is secured to a single plate is shown in Figure 9. The plate 1', which is in the form of a strip that is bent out of the plane of the strip, is formed with parts of greater breadth where the nuts are to be secured, such parts being formed with flanges 40, 41. In the form of the device shewn in Figure 9, the nut-retaining member comprises a spring clip having a nut-encircling part 42, a projection 43 which extends through the closed slot 44 in the flange 41, and urged-apart end portions which extend through the open slot 45 in the flange 40. The ends of the spring clip are bent upwardly to form finger grips 46 which, when pressed together, allow the ends of the spring clip to be withdrawn from the flange 40 through the opening in the slot 45, thus allowing the projection 43 to be brought out of engagement with the slot 44. The slot 44 may, if desired, be an open slot similar to the slot 45 in the flange 40.

In the constructional form shown in Figure 10, the nut-retaining member comprises an apertured-plate 47, one side of which is hinged to the flange 48 on the plate 1, the opposite side of the plate 47 being formed with a resilient arm 38' co-operating with the flange 39' on the plate 1 in a similar manner to the arm 38 and flange 39 of the constructional form shown in Figure 8.

In the various forms of the fastening device illustrated in the drawings, the nut-encircling part of the nut-retaining member allows the nut a limited lateral movement relatively to the plate. The lateral movement of the nut relatively to the plate may be restricted by the nut-retaining member and/or by the flanges or lugs on the plate to which the nut is secured.

In use, the fastening device may be secured to the under or "blind" side of a structural part, the part to be secured thereto placed in position and secured by a bolt which is passed through such structural parts and screwed into the nut which is retained in position to receive the bolt by the plate to which it is attached. The limited movement relatively to the plate allowed to the nut enables any small error in aligning the nut with the structural part to which it is secured to be compensated for.

The fastening device may be secured to a structural part in any convenient manner. For example, as shown in Figures 1 to 8 and 10, the plate 1 may be formed with apertured ears or lugs 11 so as to form what is in effect an anchor nut of which the nut proper is readily removable without deforming the plate 1 or the flanges or lugs thereon. Other means, however, may be employed for securing the fastening device to a structural part, e. g., the plate of the fastening device may be secured by spot welding, or by lugs or projections on the side of the plate remote from the nut which may be passed through a hole in the structural part and clinched outwardly. In Figure 9, the parts of the strip 1' between the nuts are provided with holes 13 whereby the strip may be riveted or otherwise secured to a structural part.

The improved fastening device is intended more especially for use with self-locking nuts, more particularly of the type in which the nut body is provided with an insert of elastic material, such as vulcanized fibre, which is penetrated by the threads of a bolt when the nut and bolt are screwed together, so that unintentional relative movement between the nut and bolt is prevented.

A nut of this type is shown in the various figures of the drawings, the nut 3 comprising an annular disc 9 of elastic material housed within a recess in the upper part of the nut and retained therein by the inwardly-turned edge portion 10, the hole in the disc 9 being of less diameter than the maximum diameter of the screw-threaded bore of the nut, as shown more clearly in Figure 3.

The term "flange" used in the appended claims is intended, where the contex permits, to include a lug or the like.

I claim:

1. A fastening device comprising a plate having a plurality of upstanding flanges, a nut housed between said flanges so that it cannot rotate relatively to the plate, and means at least part of which is adapted to be brought into and out of engagement with at least one of said flanges to secure the nut to the plate against unintentional withdrawal therefrom and to allow the nut to be readily removed from the fastening device when desired.

2. A fastening device comprising a plate having a plurality of upstanding flanges, a nut housed between said flanges and formed with at least one lateral projection adapted to engage the flanges on the plate so that the nut cannot rotate relatively to the plate, and a member removably securing the nut to the plate, such nut-retaining member comprising a part that substantially encircles the nut above the said lateral projection thereon and also comprising projecting parts adapted to be brought into and out of engagement with the said flanges on the plate.

3. A fastening device according to claim 2, wherein the said nut-retaining member comprises a spring clip that has projecting parts which engage the flanges on the said plate and which, on compression of the said spring clip, may be brought out of engagement with said flanges.

4. A fastening device according to claim 2, wherein the said nut-retaining member is formed from a single piece of resilient wire bent to the required shape with its ends lying closely one to the other, such ends being adapted to be forced towards one another to bring the said projecting parts out of engagement with the said flanges on the plate.

5. A fastening device according to claim 2, wherein the said nut-retaining member is formed from a single piece of resilient wire bent to the required shape with its ends lying closely one to the other, such ends extending through an open slot in a flange on the plate, so that when the said ends are pressed towards one another, they may be withdrawn through the opening in said slot.

6. A fastening device according to claim 2, wherein the nut-retaining member comprises a nut-encircling part formed with resilient arms adapted to be brought into and out of engagement with the said flanges on the plate.

7. A fastening device according to claim 1, wherein the nut is formed with at least one lateral projection adapted to engage at least one of the said flanges so that the nut cannot rotate relatively to the plate.

8. A fastening device according to claim 2, wherein the base of the nut is formed with a flange having flats thereon.

9. A fastening device according to claim 2, wherein the nut has a limited lateral movement relatively to the plate and the plate is formed with a hole which is larger than the bore of the nut so that the bore of the nut may register with the hole in the plate for various positions of the nut allowed by the limited relative lateral movement thereof.

10. A fastening device according to claim 2, wherein the nut has a limited lateral movement relatively to the plate, the said lateral movement of the nut relatively to the plate being at least partially restricted by the nut-retaining member.

11. A fastening device comprising an apertured plate having flanges thereon forming a channel, a nut housed within said channel and formed at the base thereof with a flange having flats thereon adapted to engage the said flanges on the plate so that the nut cannot rotate relatively to the plate, and means of which at least part is adapted to be brought into and out of engagement with said flanges on the plate to removably secure the nut to the plate and to restrict movement of the nut lengthwise in the channel, the hole in the plate being larger than the bore of the nut so that the bore of the nut may register with the hole in the plate for various positions of the nut allowed by the limited relative lateral movement thereof.

12. A fastening device according to claim 11, wherein the nut-securing means comprises a spring clip that substantially encircles the nut above the flange thereon and that has projecting parts which engage the said flanges on the plate and which, on compression of the said spring clip, may be disengaged from said flanges.

13. A fastening device according to claim 11, wherein the outer wall of the nut above the flange thereon is substantially cylindrical.

14. A fastening device according to claim 11, wherein the nut-securing means substantially encircles the nut above the flange thereon and has projecting parts which engage the said flanges on the plate, the said nut-securing means being formed from a single piece of resilient wire bent to the required shape with its ends lying closely one to the other, such ends being adapted to be forced towards one another to bring the said projecting parts out of engagement with said flanges on the plate.

OLIVER EDWIN SIMMONDS.